3,767,704
OXIDATION OF ETHYLBENZENES
Yun Chung Sun and James M. Winterbottom, Midland, Mich., assignors to The Dow Chemical Company, Midland, Mich.
No Drawing. Filed July 3, 1972, Ser. No. 268,824
Int. Cl. C07c 49/78, 63/02
U.S. Cl. 260—524 R                                      5 Claims

ABSTRACT OF THE DISCLOSURE

In the heavy metal catalyzed air oxidation of an ethylbenzene to the correponding acetophenone, the production of the analogous benzoic acid by product is greatly increased by the presence in the reaction mixture of the styrene corresponding to the ethylbenzene.

BACKGROUND OF THE INVENTION

This invention relates to an improved chemical process wherein the inclusion in the reaction mixture of one end product greatly increases the rate of formation of a minor byproduct.

The oxidation of ethylbenzene and substituted ethylbenzenes to acetophenone and the corresponding substituted acetophenones is a known commercial process. The oxidation is carried out by bubbling gaseous oxygen, usually as air, through the liquid ethylbenzene at about 75–200° C. in the presence of an at least partially dissolved heavy metal salt. There may also be present a carboxylic acid such as acetic acid or benzoic acid which functions at least in part to help dissolve the metal salt catalyst. Salts of metals such as manganese, iron, nickel, cobalt, vanadium, chromium, molybdenum, tin, and cerium are known to be operable in the process and a cobalt salt is usually used.

In the case of substituted ethylbenzenes particularly, the resulting acetophenone is often only an intermediate which is hydrogenated to reduce the carbonyl group and the alcohol thereby obtained is dehydrated to make the styrene as the end product. This route is the best way known to make some substituted styrenes, for example, tert-butylstyrene which is not easily made by conventional dehydrogenation of tert-butylethylbenzene.

In the liquid phase oxidation of an ethylbenzene as described above, several related byproducts are formed in minor amounts. These are principally the phenylethanol and the benzoic acid, products of a lower degree of oxidation and of complete oxidation of the ethyl group respectively. The benzoic acid byproduct, particularly a substituted compound such as tert-butylbenzoic acid, is often a far more valuable material than the acetophenone or styrene which is the main product, but unfortunately this byproduct is usually found in the reaction mixture in concentrations of the order of one percent or less and so it is ordinarily not economically practical to separate it.

SUMMARY OF THE INVENTION

It has now been found that in the oxidation process wherein ethylbenzene or a ring-substituted ethylbenzene is contacted in the liquid phase with gaseous oxygen in the presence of a heavy metal oxidation catalyst at about 75–200° C. to make the corresponding acetophenone, the rate at which the byproduct benzoic acid is formed is greatly increased when there is present in the reaction mixture a significant quantity of the styrene corresponding to the ethylbenzene starting material. The ethylbenzene has the formula

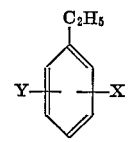

wherein X and Y are independently a hydrogen atom, a tert-butyl group, or a halogen atom. The halogens F, Cl, Br, and I are included. The corresponding acetophenone and styrene referred to above have similar formulas wherein the ethyl group is replaced by an acetyl group and a vinyl group respectively.

DETAILED DESCRIPTION

Preferably, the oxidation process is carried out at about 100–175° C. using air as the source of oxygen. The improved process is most useful as a means for making a substituted benzoic acid such as 4-chlorobenzoic acid, 2-bromobenzoic acid, 2,4-dichlorobenzoic acid, p-tert-butylbenzoic acid, and isomers thereof. By means of this improvement, the production of such a benzoic acid product is increased to the point where it is, in fact, a coproduct rather than a mere byproduct of the reaction.

The initial concentration of the styrene in the oxidation reaction mixture is not a critical condition as any significant quantity will cause a marked increase in benzoic acid production. However, an initial concentration of about 5–20 mole percent based on the total of styrene and ethylbenzene appears to maximize the production of acetophenone while providing a substantial production of the benzoic acid. Higher proportions of styrene increase the rate of benzoic acid production with some decrease in acetophenone formation but these higher concentrations also cause an increase in polymeric waste product. Even though the initial styrene concentration drops rapidly as the oxidation proceeds, the relatively low proportion which remains continues to effect a considerably enhanced rate of benzoic acid production.

Thus, by means of the above-described process modification, the relative productions of the acetophenone and the benzoic acid coproduct can be adjusted and balanced as desired to meet a changing market situation merely by changing the amount of the styrene added to the initial ethylbenzene starting material. No other change in the process conditions is necessary other than the addition of a benzoic acid separation step.

Examples 1–2

Three oxidation reactions were carried out in which tert-butylethylbenzene (mixed isomers) was contacted with air at 130° C. in the presenc of 0.3% by weight of cobalt naphthenate. In one reaction, tert-butylethylbenzene was the sole organic reactant; in the second, a mixture of about 5 parts by weight tert-butylethylbenzene and one part of the corresponding tert-butylstyrene; and in the third, a mixture of 2 parts of tert-butylethylbenzene and one part of tert-butylstyrene. Each reaction was carried out using 120 ml. of liquid reactant in an oil-jacketed glass reactor with 400 ml./minute of air bubbled through a fritted glass inlet at the bottom and with additional turbulence supplied by a mechanical stirrer. Samples of the reaction mixtures were analyzed at two hour intervals.

The tert-butylethylbenzene feed used in these experiments was about 95% of the para isomer with the remainder largely meta and very little ortho isomer. The tert-butylstyrene and tert-butylbenzoic acid had essentially the same isomer distribution.

COMPARATIVE EXAMPLE

| Compound | Mole percent of compound present | | |
|---|---|---|---|
| | Feed | At 2 hrs. | At 4 hrs. |
| t-Butylbenzene | | 0.2 | 0.1 |
| t-Butylethylbenzene | 99.7 | 86.4 | 70.1 |
| t-Butylphenylethanol | | 2.5 | 5.3 |
| t-Butylacetophenone | | 10.7 | 23.2 |
| t-Butylbenzoic acid | | 0.2 | 0.4 |
| Unknown | 0.1 | 0.2 | 0.9 |

EXAMPLE 1

| Compound | Mole percent of compound present | | | |
|---|---|---|---|---|
| | Feed | At 2 hrs. | At 4 hrs. | At 6 hrs. |
| t-Butylbenzene | 0.2 | 0.4 | 0.5 | 0.5 |
| t-Butylethylbenzene | 83.6 | 75.1 | 52.5 | 34.1 |
| t-Butylstyrene | 15.2 | 5.2 | 1.4 | 0.5 |
| t-Butylphenylethanol | | 4.3 | 4.4 | 3.3 |
| t-Butylacetophenone | | 7.8 | 29.0 | 46.2 |
| t-Butylbenzoic acid | | 5.8 | 11.2 | 14.4 |
| Unknown | 1.0 | 1.2 | 1.0 | 1.0 |
| Polymer | | | | 1.7 |

EXAMPLE 2

| Compound | Mole percent of compound present | | | |
|---|---|---|---|---|
| | Feed | At 2 hrs. | At 4 hrs. | At 6 hrs. |
| t-Butylbenzene | 0.2 | 0.5 | 0.6 | 0.4 |
| t-Butylethylbenzene | 65.3 | 61.8 | 53.1 | 37.4 |
| t-Butylstyrene | 32.5 | 13.6 | 3.6 | 1.6 |
| t-Butylphenylethanol | | 2.7 | 3.4 | 3.0 |
| t-Butylacetophenone | | 4.5 | 19.1 | 32.4 |
| t-Butylbenzoic acid | | 4.9 | 18.9 | 23.9 |
| Unknown | 2.0 | 2.0 | 1.3 | 1.3 |
| Polymer | | | | 6.8 |

In the same way as shown in the above examples, p-chlorostyrene is added to a 1-chloro-4-ethylbenzene oxidation reaction mixture to provide a substantially increased yield of p-chlorobenzoic acid in addition to the normal product, p-chloroacetophenone. Similarly, 2 - bromo - 4-tert-butylstyrene promotes the formation of 2-bromo-4-tert-butylbenzoic acid in the oxidation of 2-bromo-4-tert-butyl-1-ethylbenzene to 2-bromo-4-tert-butylacetophenone and 2,5-dichlorostyrene increases the production of 2,5-dichlorobenzoic acid in the oxidation of 2,5-dichloro-1-ethylbenzene.

We claim:

1. In the oxidation process wherein an ethylbenzene of the formula

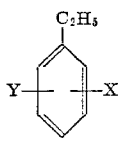

where X and Y are independently a hydrogen atom, a tert-butyl group, or a halogen atom is contacted in the liquid phase with gaseous oxygen in the presence of a heavy metal oxidation catalyst at about 75–200° C. to make the corresponding acetophenone and a small amount of the benzoic acid corresponding to said acetophenone as a byproduct, the improvement of carrying out the oxidation in the presence of a minor proportion based on the ethylbenzene of the styrene corresponding to said ethylbenzene, thereby enhancing the production of said benzoic acid.

2. The process of claim 1 wherein X is a hydrogen atom and Y is a tert-butyl group.

3. The process of claim 1 wherein the styrene is initially added to the oxidation process reaction mixture in a quantity of about 5–20 mole percent based on the total of the ethylbenzene and the styrene.

4. In the oxidation process wherein an ethylbenzene of the formula

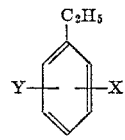

where X and Y are independently a hydrogen atom, a tert-butyl group, or a halogen atom, is contacted in the liquid phase with gaseous oxygen in the presence of a heavy metal oxidation catalyst at about 75–200° C. to make the corresponding acetophenone and a small amount of the corresponding benzoic acid as a byproduct, said acetophenone is hydrogenated to the corresponding alcohol and said alcohol is dehydrated to make the corresponding styrene, the improvement of recycling to the oxidation process reaction mixture a small but significant portion of said styrene, thereby enhancing the production of said benzoic acid.

5. The process of claim 4 wherein X is a hydrogen atom and Y is a tert-butyl group.

No references cited.

LORRAINE A. WEINBERGER, Primary Examiner
R. S. WEISSBERG, Assistant Examiner

U.S. Cl. X.R.
260—592